Figure 1:
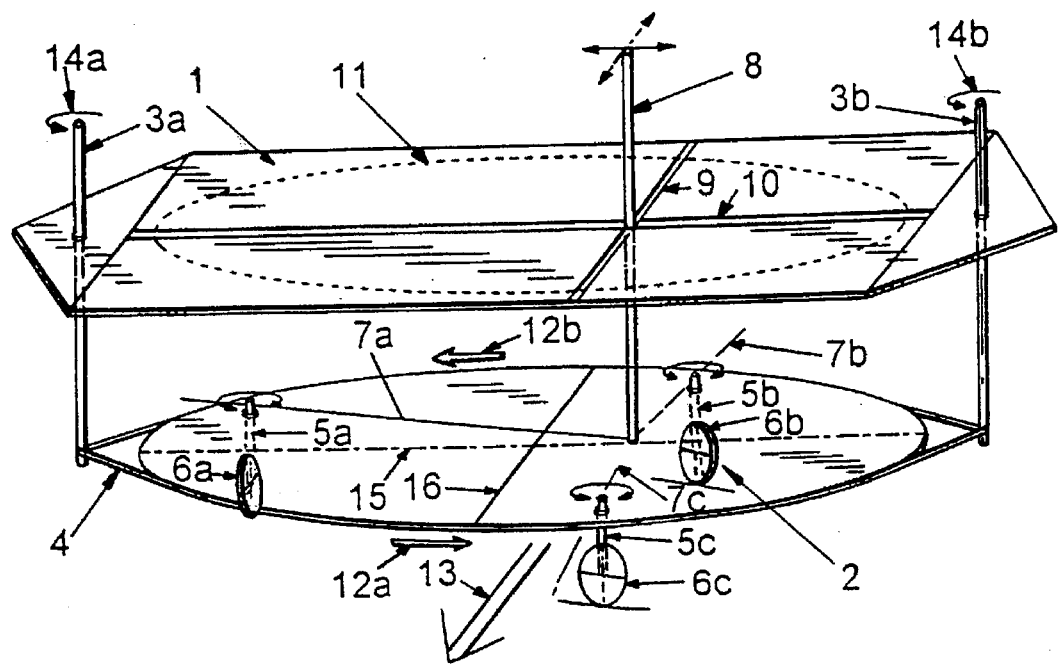

United States Patent [19]

Hathaway

[11] Patent Number: 5,645,507
[45] Date of Patent: Jul. 8, 1997

[54] CONTINUOUSLY VARIABLE TRANSMISSION SYSTEM

[75] Inventor: Nigel Anthony Hathaway, Bath, Great Britain

[73] Assignee: Eryx Limited, Douglas, Isle of Man

[21] Appl. No.: 295,904

[22] PCT Filed: Mar. 16, 1993

[86] PCT No.: PCT/GB93/00544

§ 371 Date: Oct. 26, 1994

§ 102(e) Date: Oct. 26, 1994

[87] PCT Pub. No.: WO93/19308

PCT Pub. Date: Sep. 30, 1993

[30] Foreign Application Priority Data

Mar. 17, 1992 [GB] United Kingdom .................. 9205753

[51] Int. Cl.⁶ .................................................. F16H 15/04
[52] U.S. Cl. ...................... 476/47; 74/84 R; 476/54
[58] Field of Search ............... 74/84 R; 476/38, 476/47, 54; 472/59, 60, 61; 434/29, 30, 45, 59, 71

[56] References Cited

FOREIGN PATENT DOCUMENTS

| 1082202 | 12/1954 | France . |
|---|---|---|
| 1252806 | 12/1960 | France . |
| 1432515 | 2/1966 | France . |
| 2229890 | 12/1974 | France . |

*Primary Examiner*—Richard M. Lorence
*Assistant Examiner*—Troy Grabow
*Attorney, Agent, or Firm*—Kane, Dalsimer, Sullivan, Kurucz, Levy, Eisele and Richard, LLP

[57] ABSTRACT

A continuously variable transmission used for translating between rotary motions or between rotary and linear motions, for use in automotive, industrial and robotics applications, operating with the following principles: an upper section (1) is allowed to freely move in all directions parallel to the surface below, but is not allowed to rotate. A disc (2) in a lower section is constrained such that its centre is always directly below the centre of the upper section (1). The disc (2) in a lower section is constrained such that its centre is always directly below the centre of the upper section (1). The disc (2) is rotated in the direction (12) shown relative to the upper section (1), and the freely rotating wheels (6) are steered by rods (7) that slide through wheel supports (5). The rods (7) meet at a coincidence point controlled by rod (8) which is set at a particular point relative to the upper section (1). For the position of rod (8) shown and rotation (12) shown, the upper (1) and lower (2) sections will move along the surface, without slippage of the wheels (6), in the direction of arrow (13). For a given speed of rotation of disc (2), the speed of movement along the surface will increase as the distance of the coincidence point from the center of the disc increases.

15 Claims, 6 Drawing Sheets

CONTINUOUSLY VARIABLE TRANSMISSION SYSTEM

This invention relates to a continuously variable transmission system, and to a method of providing a continuous variable transmission, for the purpose of converting between two rotary motions or between rotary and linear motion, for use, for example, on vehicles or for controlling the motion of robots or parts of machinery or other equipment requiring servos or rotary or linear actuators. In the automotive industry, the invention is especially, but not exclusively, suitable for use on combustion-engine vehicles in the place of a conventional gearbox and clutch, and on battery vehicles in the place of conventional motor speed control equipment. In the machinery and robotics industries, the invention is especially, but not exclusively, suitable as a precision, high-torque rotary or linear servo mechanism. The invention is also suitable for use in other equipment and vehicles requiring motion, examples of which are pedal cycles, toys, amusement arcade games, training simulators and theme park rides using either fixed track or independent passenger cars.

Conventional combustion-engine vehicles usually couple the engine to the wheels via a friction or fluid clutch and a set of discrete gears, shifted manually or automatically. Such arrangements provide only limited optimisation of the engine's fuel economy and torque transfer characteristics. Some vehicles do use continuously variable transmissions, typically employing a system using a belt or chain trapped between two cones that move together and apart altering the effective diameter of the drive hub, but these tend to be less reliable and efficient and capable of transmitting less torque. Various other kinds include: friction drives involving metal spheres and surfaces making contact via a lubricant shear—these suffer from the need for high internal forces compared to the torque transmitted; hydrostatic drives that drive hydraulic motors using variable displacement pumps—these tend to be comparatively expensive; and ratcheting drives which generate a variable amplitude oscillating motion, rectifying this motion to produce output speed—these tend to be complex internally and suffer from a superimposed oscillation on the transmission ratio.

Conventional battery vehicles usually use direct current motors controlled by power electronics or switched resistors. Some vehicles use regenerative braking which returns some of the kinetic energy of the vehicle to the battery as it slows down. The major disadvantage of this arrangement is that conventional friction braking needs to be utilised in addition to regenerative braking, as the energy losses at low speed in the motor and power electronics prevent a substantial amount of the kinetic energy from being recovered.

Conventional actuators and servos are usually based around either a direct current motor coupled to an optical shaft encoder or a stepping motor, both arrangements being controlled by power electronics. The sizes of the motor and the driving transistors increase with an increasing requirement for torque, and the combined costs rise increasingly rapidly with size. Furthermore, an individual servo motor and amplifier is needed for each axis of motion, and a mechanical arrangement, such as a ball-screw, is needed to convert from rotary to linear motion. For very large forces, servo-hydraulics is used which is more costly still.

It is the object of the present invention to provide an improved continuously variable transmission system.

The present invention provides a continuously variable transmission system comprising:

at least two rotary members, a common member mounted on the rotary members, a surface with which the rotary members cooperate, the rotary members being free to rotate about their own axes of rotation and having perimeter regions cooperating with the surface at respective regions of cooperation in such a manner that substantial slippage of each rotary member relative to the surface in a direction parallel to the axis of rotation of the rotary member is prevented, and steering means operative to steer each rotary member about a respective axis, the common member and the surface being mounted for first and second kinds of motion relative to one another, the first kind of motion being relative rotation of the common member and the surface about an axis which is fixed relative to the common member and around which the rotary members are spaced, and the second kind of motion being a different relative motion of the common member and the surface, the steering means being arranged to steer the rotary members to vary continuously the ratio of the amount of the first kind of relative motion of the common member and the surface to the amount of the second kind of relative movement of the common member and the surface.

For most practical purposes, the surface will he either substantially flat or substantially spherically curved and the axis about which each rotary member is steered substantially intersects the axis of rotation of the respective rotary member, and is approximately normal to the surface passing through it near or at the centre of the area of cooperation between the rotary member and the surface. In that case, the axis of rotation of the common member needs to be substantially normal to the surface so that transmission can occur; it is also then the case that for each rotary member its own axis of rotation and its steering axis will lie in substantially the same plane and that those planes of the respective rotary members will intersect along a common axis, which may be referred to as the coincidence axis. In the case where the surface is substantially flat, the coincidence axis will normally be substantially parallel to the axis of rotation of the common member, the direction of relative translational movement between the common member and the surface will be perpendicular to the plane in which the two axes lie, and the transmission ratio will be proportional to the separation of those two axes. In the case where the surface is substantially spherically curved, the coincidence axis and the axis of rotation of the common member will pass through the centre of curvature of the surface and the transmission ratio will be proportional to the tangent of the angle between those two axes.

The transmission system of the invention provides a smooth transmission of continuously variable transmission ratio, which is nonetheless reasonably simple and economical to produce. The system can be used in a wide variety of applications with different forms of the system being especially advantageous for different applications, some of which will be referred to below.

Although it is possible to have only two rotary members, it is usually advantageous to have a larger number of smaller members chosen in size and number so as to reduce the length of contact on the surface of each rotary member whilst increasing the total length of contact and at the same time remaining within economical and practical limits. A consideration that applies when only two rotary members are used and that could in theory apply with more than two rotary members is that both or all the regions of cooperation of the rotary members with the surface should not lie in a plane common with the axis of rotation of the common member as that can lead to a loss in transmission. The rotary member may be at different distances from the axis of rotation of the common member but are preferably equidistant from that axis of rotation.

Preferably there are between 4 and 18 rotary members and there may be 6, 12 or 18 members.

Preferably each rotary member is inclined to the surface with which it cooperates such that the axis of rotation of the rotary member passes through a plane tangential to the surface at the centre of the circle described by the motion of the rotary member along the surface. Under conditions of non-zero transmission, the radius of the circle just referred to is continually changing, and so therefore is the amount of preferred inclination of the rotary members. Because, under most circumstances, the forces that occur during the transmission of power act so as to change the angle of inclination, it is more practical in many arrangements to fix the amount of inclination, preferably to meet the requirement in the condition of zero transmission.

For most purposes it is preferable that the rotary members are steered, the steering means including a plurality of guides, one for each rotary member, each guide providing a mechanical link between a respective rotary member and a common control by movement of which the rotary members are steered. Each guide may join a point on the respective rotary member's steering axis to a common point, or differing points, along the coincidence axis, allowing for the distance between those two points, and the angle between the guide and the rotary member's steering axis, to vary as necessary as the common member rotates. For example, the guides may comprise rods that are slidable through hinged slots above each rotary member and each be fixed at one end to a common flexible joint whose position is controlled so as to control the transmission ratio and direction. Such a mechanical steering means is advantageous in that it is relatively simple and does not require an electricity supply. It would, however, be possible for the steering of each rotary member to be individually controlled from a common electronic control system.

An alternative to fixing the guides to a common flexible joint is for the common control to comprise a ring to which the guides are pivotally connected. Movement of the ring steers the rotary members. In this arrangement, the ring is prevented from rotating relative to the common member; the guides may be fixed against sliding at their connection to the ring but slide at the rotary members' steering axes, or vice versa or there may be a combination of sliding, possibly using additional mechanisms for example telescopic slides, such that the distance between the guide ring connections and the steering axes is allowed to vary as necessary. In an embodiment of the invention to be described below, the steering ring lies inside the rotary members, but it may lie inside or outside as proves most appropriate to a particular embodiment, and the connections to the ring may lie at different distances from the centre of the ring. The position of the ring determines the position of the coincidence axis. An advantage of using a steering ring is that the length of the guides may be significantly reduced, so that they do not tend to interfere with one another or any other part of the system.

Under certain circumstances it is advantageous to alter the effective positions of the rotary members' steering axes by coupling steering members for the rotary members to other members steerable about other steered axes which are displaced towards or away from the common member's axis of rotation, the other steered axes being positioned in the same relative positions from the axis of rotation of the common member as the original steering axes. The steering of the other members is substantially identical to the steering of the rotary members about their respective steering axes. Coupling may, for example, be achieved by the use of synchronous drive belts and pulleys mounted on the steering axes and the other steered axes. This is particularly useful, for example, for reducing the required sizes and movements of the steering guides, by arranging for the new axes to be closer to the axis of rotation of the common member. Where the surface is spherical, this enhancement creates a virtual sphere that is smaller than the actual sphere, and this may provide the added advantage that the guides' common joint may be moved onto the virtual sphere's virtual axis of rotation, leading to the situation where the sphere may rotate without rotation of the common member. This latter arrangement is useful in that it provides a "neutral" position for an automotive or other transmissions using this arrangement. Thus it is possible to achieve all possible transmission ratios, from zero to infinity in both positive and negative directions.

It is advantageous to be able to measure or monitor the torques that are transferred by the transmission and, for that purpose, while the steering axis of each rotary member preferably substantially intersects the axis of rotation of the respective rotary member, it may be arranged that, for one or more of the rotary members, the steering axis of the rotary member is offset by a small distance from passing through the rotary member's axis of rotation. Such an arrangement results in an overall force on the steering system which is related to the size and direction of the torques and forces that are being transmitted. Measurement of those forces will be typically used as feedback to an electronic or mechanical control system used to regulate the transmission ratio and direction.

Whilst it is satisfactory in many applications to rely simply on frictional engagement of the rotary members and the surface, it will sometimes be advantageous for there to be positive engagement between one or more of the rotary members and the surface, the positive engagement resisting movement of the rotary member relative to the surface in a direction parallel to the axis of rotation of the rotary member.

A positive engagement between the rotary members and the surface may be advantageously achieved by arranging for one or more of the rotary members or the surface or any combination thereof to deform as the rotary members roll over the surface, such that the forces transmitted between a particular rotary member and the surface rely on abutment between two surfaces and the relative direction of the transmitted force does not lie on the overall plane of contact (without taking account of the deformation), but approaches being normal to the contact plane. An example of such an arrangement may comprise a surface consisting of a coating of a flexible polymer and rotary members that are very narrow at their points of contacts with the surface. In that case the rotary members are pressed into the polymer coating making a temporary impression in the coating. Further examples include arrangements where the surface is knurled, or where the surface consists of protruding pins that bend or retract to allow rotary members to pass between them. Such arrangements, which enable a substantial force to be transmitted perpendicular to the direction of travel of each rotary member, provide a significant improvement in torque transfer characteristics as compared with most conventional continuously variable transmissions which use either pure friction or traction via a lubricant shear.

Similarly, a positive engagement may also be achieved if the rotary members penetrate through the surface. Thus, the rotary members and the surface may engage one another in such a way that parts of the rotary member are actually further from the axis of rotation of the rotary member than parts of the surface, and that may occur with or without substantial deformation of the wheels or the surface. Examples of such arrangements are spiked wheels engaging into a mesh, one or more parallel wheels per rotary member running between protrusions emanating from the surface, dimpled wheels running over such protrusions, and a gripper system where the rotary members have jaws which close and open as they pass through the region of engagement, these jaws gripping protrusions, or a wool, or bristles, or hooks, or loops or other suitable construction.

As already indicated the surface may be substantially flat but it may also be curved; more particularly, the surface may be the outside of a sphere, or a part of a sphere, constrained to rotate about a fixed axis. Such an arrangement provides a rotary continuously variable transmission, and can be used where rotary transmission is required. Fields of application include, but are not limited to, automotive gearboxes, variable speed drives, gearboxes for manufacturing machinery producing products of variable size, servos used in robotics, and power generation where the power source consists of a fluid moving at varying speeds, such as wind or water, and where the generator is required to rotate at a fixed, synchronous speed.

The sphere may contain the mechanism of a differential gearbox. Two output shafts may extend out from the inside of the sphere and these may drive the wheels of a vehicle directly. This arrangement may thus provide a single unit to replace the clutch, gearbox and differential on a vehicle, and may also remove the need for a handbrake.

The surface may also be the inside of a sphere or a part of a sphere constrained to rotate about a fixed axis. Such a system can be embodied in a physically smaller unit, such as may be useful, for example, for use on bicycles.

When the surface is substantially flat a planar continuously variable transmission can be provided that can be used where rotary motion is required to be translated into motion on two dimensions of a plane. This arrangement is particularly useful in a system requiring high performance motion in multiple degrees of freedom at low cost, such as vehicle or flight simulators used for training or as arcade games. The surface may be completely flat or may have a small amount of curvature imparted to it.

It is also possible to have an arrangement where the surface is part of a substantially flat plane and the motion of the common member is constrained to move along a fixed path in the direction of that path. Such an arrangement is a linear continuously variable transmission and can provide for paths that are substantially straight and those whose direction varies. It can be used where rotary motion is required to be translated into linear motion. Applications include, but are not limited to, linear actuators of various kinds.

Especially in the cases of the rotary and linear continuously variable transmissions, the operative part of the surface may be limited in its extent, in that the rotary members may be arranged such that one or more of them move into and out of operative engagement with the surface as the common member rotates. The moving out of operative engagement may be caused by an absence of surface or, preferably, the presence of a surface that allows a substantially greater degree of slippage of the rotary member on the surface in a direction perpendicular to the direction of rotation of a rotary member. An inoperative region of the surface is typically placed at opposite edges of the circle described by the rotary members as the common member rotates, at the place that the rotary members rotate about their steering axes at their fastest for a particular speed of rotation of the common member and a high transmission ratio. Those areas occur towards the axis of rotation of the sphere (in the case of rotary transmissions) or at the sides of the drive track (in the case of linear transmissions). Limiting the extent of the operative surface in this way provides for greater efficiency at higher transmission ratios.

For certain applications it is especially advantageous for there to be a plurality of common members, each mounting at least two rotary members which cooperate with the surface. The common members may be rotated by the same or different sources. The common members are preferably mounted on the same framework and their centres of rotation may or may not be concentric.

The common members may form part of a mobile arrangement which runs on the surface.

An especially advantageous embodiment of the invention is a rotary continuously variable system using two or more common members and serving as a transmission for a hybrid vehicle that combines the use of a combustion engine and an electric motor driven from a battery. In such vehicles, energy is taken from the battery on acceleration and returned to the battery on deceleration. The combustion engine is used to provide energy beyond the storage capacity of the battery. An appropriate control system regulates the flow of energy around the system.

Another especially advantageous embodiment of the invention is a planar continuously variable transmission system using two or more common members and serving as a transmission for a fully manoeuvrable vehicle, whose orientation and direction of motion can be controlled independently of one another. In this mobile arrangement, the rotary members act directly on the surface on which the vehicle runs. Such an arrangement may be appropriate, for example, for floor cleaning equipment used in factories or warehouses. Each common member may be surrounded by bristles to combine the cleaning brushes with the drive and steering apparatus.

In some circumstances it may not be appropriate for the rotary members of a mobile arrangement to act directly on the surface on which the arrangement runs. In that case the surface, which the rotary members engage may be defined by an intermediate part of the transmission system that is interposed between the rotary members and the other surface over which the mobile arrangement runs. For example, such a system may comprise two common members, coupled so as to rotate in a substantially identical manner, and acting on respective parts of a common sphere that in turn is in contact with another surface. This is particularly appropriate, for example, as part of a mobile arrangement, such as a manually or automatically guided vehicle where a full three degrees of freedom are required, but where the floor or ground is not suitable to be contacted by continually moving wheels. As a further example, a single common member may act on a single interposing sphere, where that sphere is constrained to rotate in a single direction by a plurality of additional steering wheels that are not mounted onto the common member, but act in an interdependent manner so as to allow rotation of the sphere about an axis which is determined by the angle at which the steering of those wheels is aligned, without substantial slippage of those wheels in a direction along their axes of rotation. This configuration allows for only two degrees of freedom, in the same way as the planar continuously variable transmission. Other examples may include a system where the inside of a wheel has a spherically curved surface, onto which the drive wheels act; or a system using a type of segmented or continuous track or belt, the drive wheels acting on the inside of this track or belt. As is the case in the majority of the arrangements herein described, accurate motion can be obtained from a relatively unregulated source of motion by means of an appropriate system for controlling the transmission ratio and direction of the transmission system.

The present invention also provides a feedback mechanism including a continuously variable transmission system as defined above, and also a mechanical amplifier including a continuously variable transmission system as defined above.

One especially useful means of controlling the transmission ratio is through the use of a mechanical feedback system. A further motion control input to the system is provided, which requires a comparatively small torque or force to drive it. The output of the continuously variable transmission substantially follows the control input as a result of the action of a feedback mechanism, the combination of continuously variable transmission and feedback mechanism together forming a mechanical amplifier.

A rotary mechanical amplifier embodying the invention may be formed from a rotary continuously variable transmission whose steering and transmission ratio is controlled by guides. The position of coincidence of the guides is moved along a line parallel to the axis of an output shaft by an appropriate arrangement which compares the motion of the output shaft and a control shaft, and moves the position of coincidence in accordance with the difference between the two motions. Such an amplifier is described below with reference to FIG. 16 of the drawings. The configuration may be controlled by a purely mechanical source of motion, such as a hand wheel, or from a device such as a stepping motor. The power input may, for example, be driven from an unregulated induction motor, taking its supply directly from a mains electricity supply. It may also, for example, be driven from an unregulated direct current motor, taking its supply directly from a battery.

One particularly useful arrangement using two rotary continuously variable transmissions or mechanical amplifiers, one of which may contain a differential gearbox, may be used to conserve energy on vehicles that run a stop-start duty cycle such as buses, taxis or light railway systems. The engine drives a flywheel via the first transmission which in turn drives the wheels via the second. The kinetic energy of the vehicle is transferred to the flywheel as the vehicle decelerates, and is transferred back to the vehicle as it accelerates.

A planar or linear mechanical amplifier may similarly be formed from a planar or linear continuously variable transmission whose steering and transmission ratio is controlled by guides. The position of the coincidence of the guides is moved by a mechanism which compares the positions of a control point that moves parallel to the surface (this representing the input signal to be amplified) and a reference point on the mounting of the common member. Differences in those positions are reflected by a movement of the position of coincidence at right angles to the direction of the difference. The configuration may be controlled by a purely mechanical source of motion, such as a handle, or from an external low torque linear or X-Y positioning or guidance system. Mechanical power input can be provided by a motor suitable for rotating the common member.

The present invention also provides a method of providing a continuously variable transmission between a common member on which at least two rotary members Are mounted and a surface with which the rotary members cooperate, the rotary members rotating about their own axes of rotation and having perimeter regions cooperating with the surface at respective regions of cooperation without substantial slippage of the rotary members relative to the surface in a direction parallel to the axis of rotation, each rotary member being steered about a respective axis, the common member and the surface moving relative to one another with two kinds of motion, the first kind of relative motion being relative rotation of the common member and the surface about an axis which is fixed relative to the common member and around which the rotary members are spaced and the second kind of relative motion being a different relative motion of the common member and the surface, the steering of the rotary members being such as to allow continuous variation of the ratio of the amount of the first kind of relative motion to the amount of the second kind of relative motion.

In all cases hereinbefore defined, the direction of primary power transfer may be in either direction: from the common member to the surface or vice versa.

Figure 2:
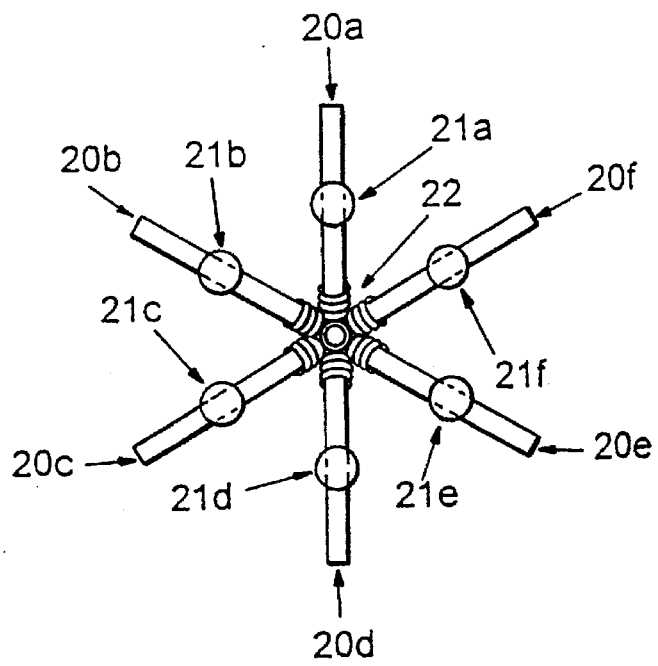
Figure 3:
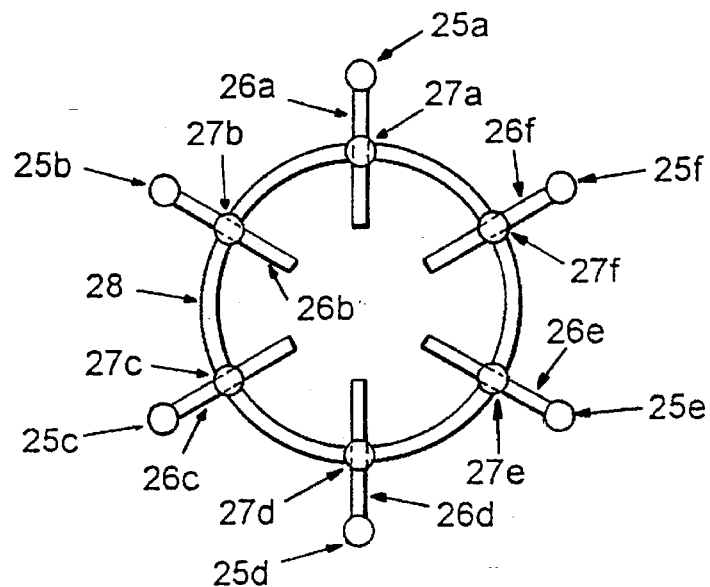
Figure 4:
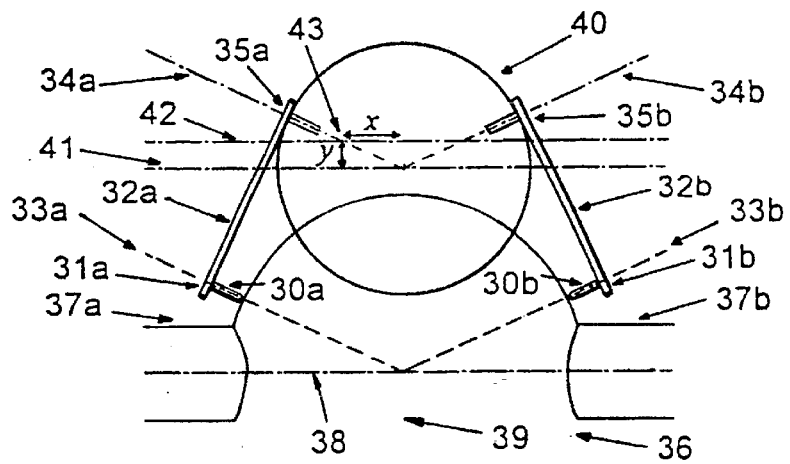
Figure 5:
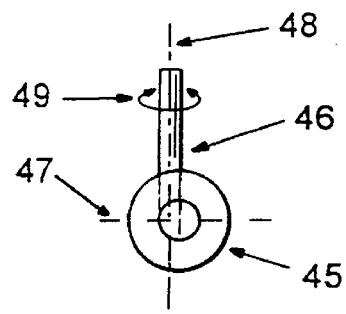
Figure 6:
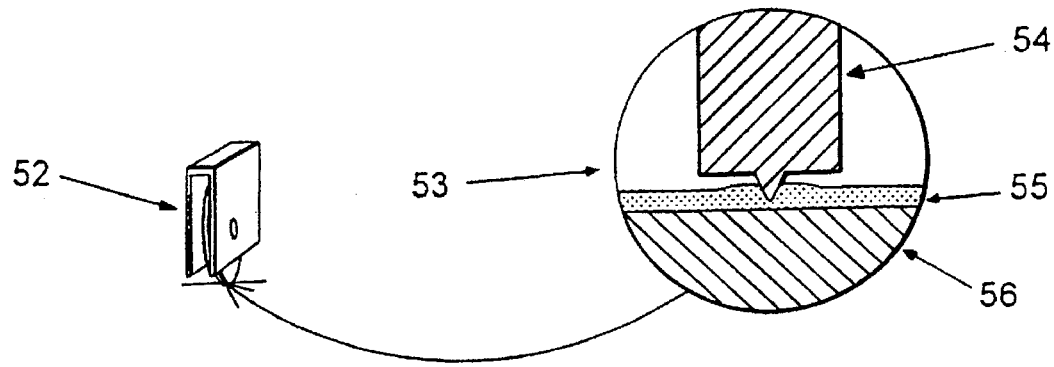
Figure 7:
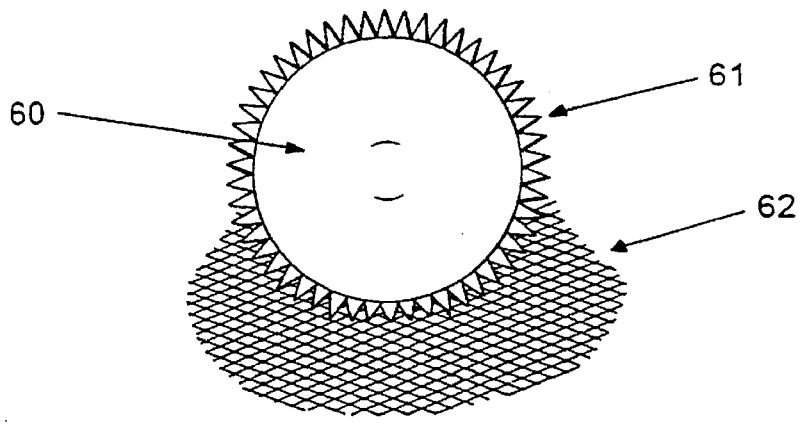
Figure 8:
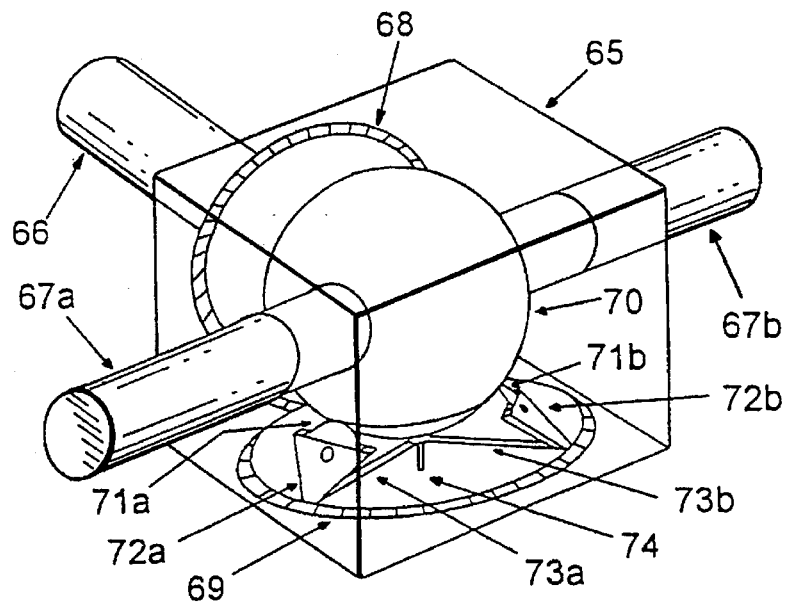
Figure 9:
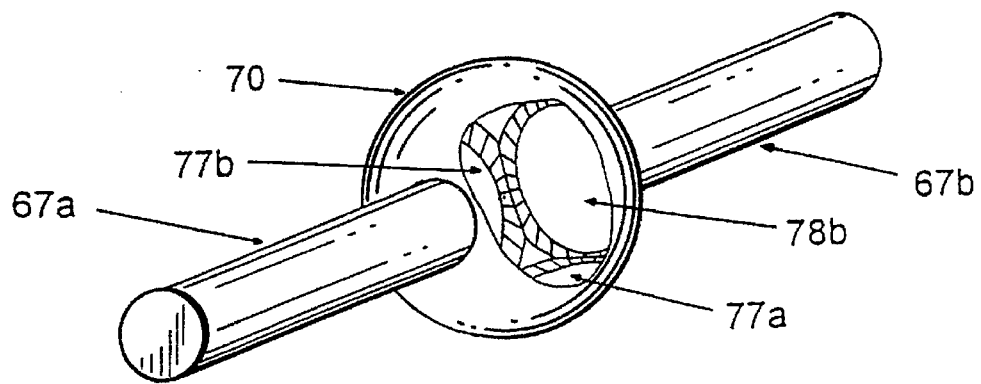
Figure 10:
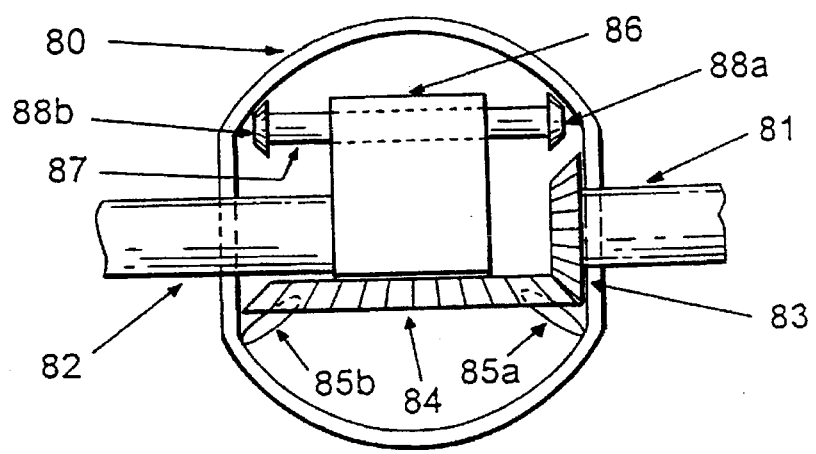
Figure 11:
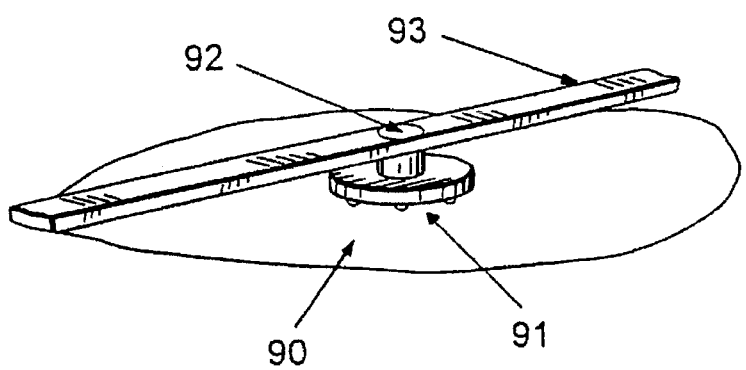
Figure 12:
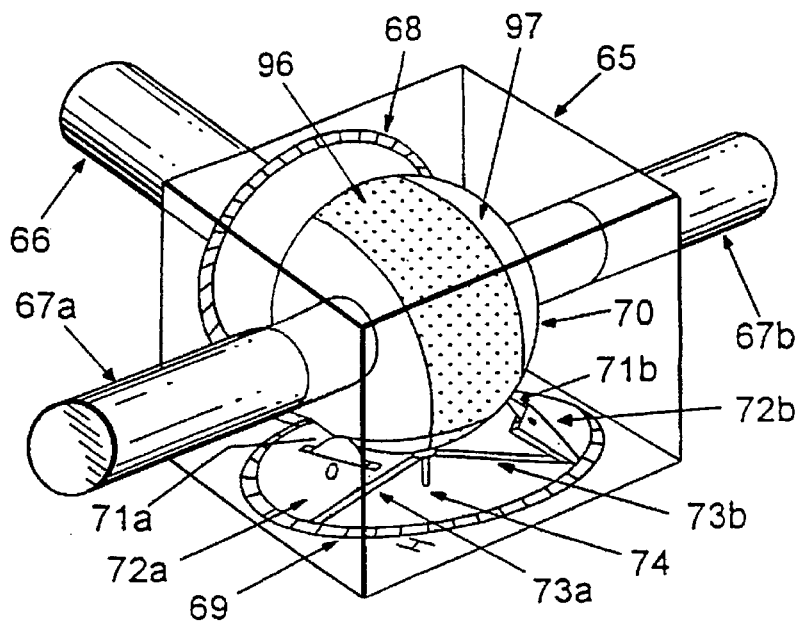
Figure 13:
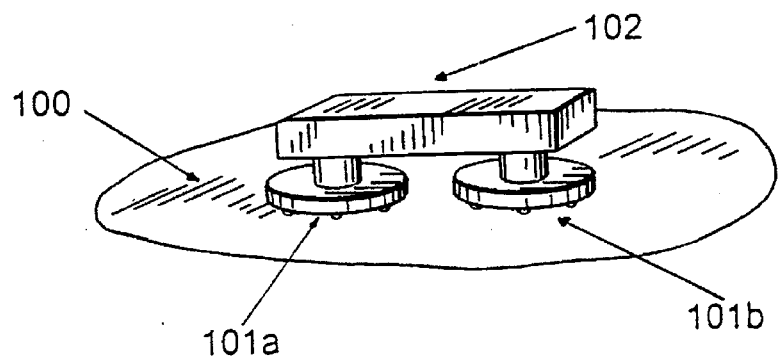
Figure 14:
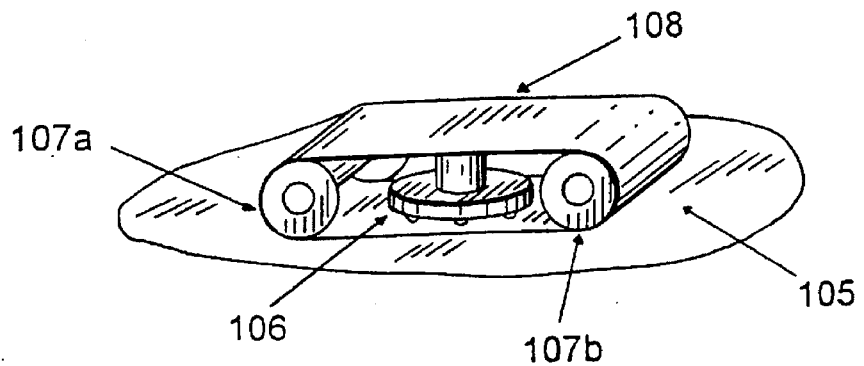
Figure 15:
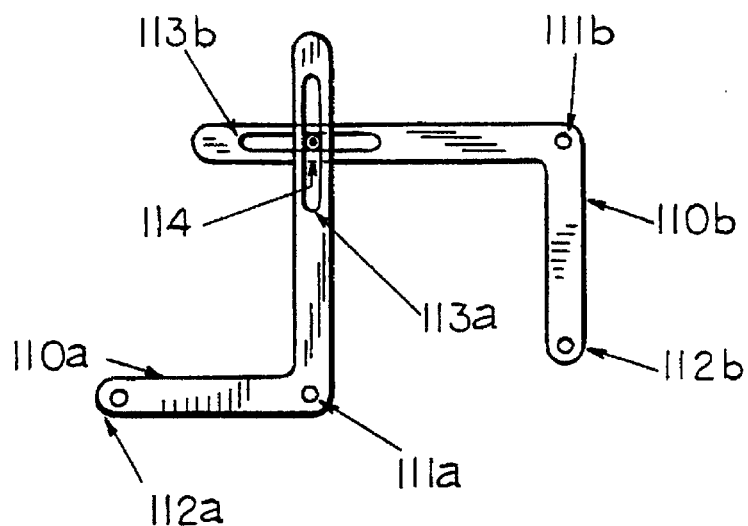
Figure 16:
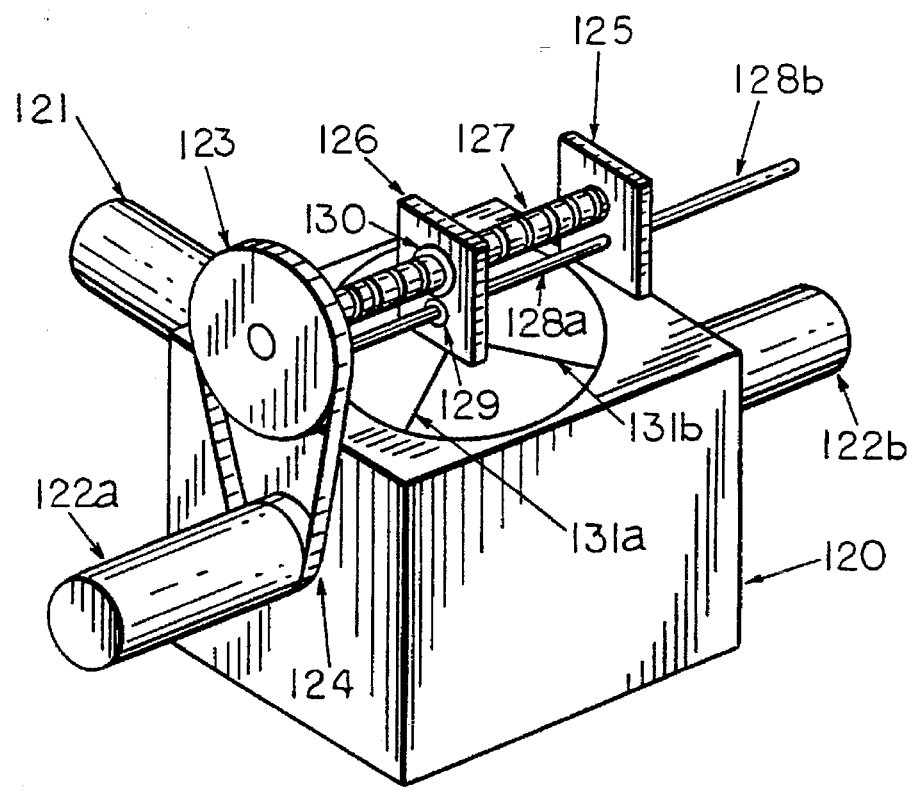

Various arrangements of a continuously variable transmission system embodying the invention and arrangements in which it may be employed will now be described, by way of illustration and example only, with reference to the accompanying drawings, in which:

FIG. 1 is a schematic drawing showing the principle of operation of a planar continuously variable transmission, FIG. 2 is a schematic plan view of a steering system using guides, FIG. 3 is a schematic plan view of a steering system using guides coupled to a steering ring, FIG. 4 is a schematic side view of a rotary continuously variable transmission with displaced steering axes, FIG. 5 is a schematic side view of a rotary member with an offset steering axis, FIG. 6 includes a magnified cross-sectional view of a rotary member which engages a surface by deforming it, FIG. 7 is a side view of a rotary member which penetrates through a surface, FIG. 8 is a schematic perspective view of a rotary continuously variable transmission, FIG. 9 is a partly cut-away view of a spherical section of a rotary continuously variable transmission containing a differential, FIG. 10 is a schematic side view of a rotary continuously variable transmission where rotary members engage on the inside of a sphere, FIG. 11 is a schematic perspective view of a planar continuously variable transmission, FIG. 12 is a schematic perspective view of a rotary continuously variable transmission with rotary members operatively engaging a surface over a limited region only, FIG. 13 is a schematic perspective view of a system where two planar continuously variable transmissions engage the same surface, FIG. 14 is a schematic perspective view of another planar continuously variable transmission, FIG. 15 is a schematic plan view of a linkage for use in a feedback mechanism, and FIG. 16 is a perspective view of a rotary mechanical amplifier.

In the drawings various parts and mechanisms are omitted from a drawing in the interests of clarity of illustration of the particular feature being exemplified in the drawing.

FIG. 1 is a schematic drawing showing the principle of operation of a planar continuously variable transmission embodying the invention. The transmission comprises upper and lower sections. The upper section 1 is allowed to move freely in all directions parallel to a plane below, but is not allowed to rotate. The centre of a disc 2 (common member) in the lower section is constrained such that its centre is always directly below the centre of the upper section 1. The disc 2 in the lower section is mounted on three wheels 6a, 6b and 6c, which are equispaced from the centre of the disc and are free to rotate about their horizontal axes. The wheels 6a, 6b and 6c rest on a planar surface (not shown) and are also free to rotate about their vertical axes with respect to the disc, but this motion is constrained by rods 7a, 7b, 7c that pass through respective supports 5a, 5b and 5c for the wheels 6a, 6b and 6c respectively. Each rod passes through a hole in its respective wheel support, the hole being vertically above and having its axis parallel to the horizontal axis of rotation of the wheel. As shown in FIG. 1, the supports 5a, 5b and 5c pass through the disc 2, being rotatably mounted on the disc, and the rods 7a, 7b and 7c pass through holes in the respective supports 5a, 5b and 5c that are provided above the disc 2. Thus the wheels are effectively steered by these rods. The three rods 7a to 7c are constrained such that they meet at a single coincidence point, which is the bottom of a rod 8 that connects the upper and lower sections. This connecting rod 8 is maintained vertical by guides 9 and 10 and is positioned with respect to the upper section 1 anywhere within the dotted circle 11. The dotted circle 11 represents the path described by the centres of the wheels 6 (projected onto the upper section) as the lower disc 2 is rotated about its centre with respect to the upper section 1. The lower disc 2 is rotated by a belt 4 which is driven by two rods 3a and 3b together rotated with respect to the upper section 1 in the directions shown by arrows 14a and 14b.

If the lower disc 2 is rotated anti-clockwise as shown by arrows 12a and 12b, and the coincidence point is positioned at the centre of rotation, then no translational motion can take place. If, however, the coincidence point is moved to the right, to the position shown, then the upper and lower sections together move forward along the plane in the direction shown by arrow 13. This can be understood by considering a small increment of movement from the position shown in FIG. 1. The disc 2 is compelled, by the direction in which the wheels 6a to 6c are steered, to rotate on the surface on which it is resting about an axis aligned with the rod 8. Thus the centre of the disc 2 moves forward in the direction shown by arrow 13. As it does so, the axis about which it is constrained to rotate also moves forward the same amount. Thus the disc 2 will continue to move in the direction shown by arrow 13, as long as the rod 8 lies on the axis 15 of the disc 2 and displaced to the right of the axis 16.

From the description above, it should also be understood that as the rod 8 is moved further to the right so the spacing of the centre of the disc 2 from the axis of the rod increases and therefore the ratio of the amount of translational movement of the disc 2 to the amount of rotational movement about its central axis increases. The direction of the translational movement is perpendicular to the direction of a straight line joining the axis of the rod 8 to the centre of the disc 2.

Thus the mechanism shown in FIG. 1 provides a continuously variable transmission system comprising three wheels 6a to 6c, a disc (or common member) 2 mounted on the wheels and a surface on which the wheels 6a to 6c rest. The wheels 6a to 6c are free to rotate about their own axes of rotation. The wheels 6a to 6c are steered about respective axes corresponding to the longitudinal axes of supports 5a to 5c, those steering axes intersecting the axes of rotation of the wheels. The disc 2 is able to rotate about its centre and is also able to move translationally over the surface on which the wheels rest. The wheels are steered by the rods 7a to 7c which are all connected to the rod 8 and by changing the position of the rod 8 relative to the centre of the disc 2 it is possible to vary continuously the ratio of the amount of rotation of the disc 2 to the amount of translational movement of the disc over the surface.

It should be noted that although it would be more usual for the rotation of the disc 2 to be driven, thereby leading to the translational movement of the disc, the opposite is possible: the translational movement could be driven, thereby leading to rotation of the disc 2.

FIG. 2 is a schematic plan view of a steering system using guides. The example illustrated is for six wheels 6. The guides are in the form of rods 20a to 20f which freely slide through steered wheel supports 21a to 21f, which are free to rotate about central vertical axes. The point of coincidence of the rods 20a to 20f is maintained by a flexible member 22 which is moved in a horizontal plane, at the same time allowing the angles between the rods to vary. It will be understood that the rods 20a to 20f in FIG. 2 correspond to the rods 7a to 7c in FIG. 1 and the supports 21a to 21f in FIG. 2 correspond to the supports 5a to 5c in FIG. 1.

FIG. 3 is a schematic plan view of a steering system using guides linked to a steering ring. The guides are in the form of rods 26a to 26f which are fixed to steered wheel supports 25a to 25f, which are free to rotate relative to the rods about vertical axes. The rods pass through reference members 27a to 27f which are connected to the steering ring 28 in such a way that they are allowed to be rotated about their own central vertical axes. Steering ring 28 moves in the horizontal plane and without rotation relative to the steered members 25a to 25f, with the effect that coincidence of the projected lines of rods 26a to 26f is maintained and the coincidence point moves also in the horizontal plane.

FIG. 4 is a schematic side view of a rotary continuously variable transmission with displaced steering axes. Rotary members 30a and 30b engage a sphere 36 which is supported by and drives two shafts 37a and 37b which, together with the sphere 36, rotate about axis 38. Each rotary member 30a, 30b is steered by a respective pulley 31a, 31b driven by a respective belt 32 which in turn is driven by a respective pulley and steering system 35a, 35b. The pulleys 31a and 31b rotate about axes 33a and 33b respectively while the pulleys 35a and 35b rotate about axes 34a and 34b respectively. Axes 33a and 34a are parallel as are axes 33b and 34b. Thus steering of pulleys 35a and 35b effectively steers the rotary members 30a and 30b in just the same way as if the pulleys were being directly steered. The displaced steering pulleys behave as if they are controlling the steering of wheels on a virtual sphere 40 which is displaced along the original sphere's centre line 39. Given the presence of a suitable steering mechanism for the pulleys 35a and 35b which is capable of moving the coincidence point in a plane within the upper half of circle 40, hinging and altering the length between the coincidence point and the pulleys 35a and 35b, then any ratio is achievable. If the coincidence point is displaced a distance y from axis 41 to axis 42, and displaced a distance x from axis 39 so that it is at point 43, then the transmission ratio is given by the ratio x/y.

FIG. 5 is a schematic side view of a rotary member with an offset steering axis. The rotary member, which is a wheel 45, with centre line 47, is steered by a member 46 about an axis 48 in the direction shown by arrow 49. The axis 48 is offset from the centre of the wheel so that forces exerted on the wheel parallel to its axis of rotation by the surface on which the wheel is resting give rise to internal forces in the member 46. Knowledge of those forces can provide a useful indication of the force transmitted by the system.

FIG. 6 has two parts: on the left is a perspective view of an assembly including a rotary member 54 resting on and engaging a surface; on the right, in the part of the drawing referenced 53 is a magnified cross-sectional view of the rotary member 54 which deforms the surface that it engages. The rotary member 54 has a sharp rim which digs into a softer layer of material 55 which is fixed to a bed 56. The positive engagement of the rotary member and the surface allows for large sideways forces to be transmitted between the member 54 and the bed 56. If there were only frictional engagement the forces that could be transmitted would be smaller.

FIG. 7 is a side view of a rotary member 60 which has conical spikes 61 around its perimeter. In this case the surface is defined by a mesh 62 and the spikes 61 pass through openings in the mesh 62. The spikes 61 and/or the mesh 62 may be resilient to allow for misalignment of a spike 61 and an opening in the mesh 62 as the spike penetrates the mesh.

FIG. 8 is a schematic perspective view of a rotary continuously variable transmission with a horizontal input shaft 66 at the back and a double-ended horizontal output shaft 67a and 67b. The input shaft 66 is coupled to a disc 69 corresponding to the disc 2 in FIG. 1 via right-angle gearing 68. The output shaft has a spherical section 70 onto which wheels 71a and 71b engage. A control lever 74 for controlling the coincidence point of the steering rods 73a and 73b which steer the wheel casings 72a and 72b is shown protruding below, and it is moved along a line parallel to the centre line of the output shaft. The wheel casings are constrained by additional constraining means (not shown) to maintain the steering axis of each wheel and the respective steering rod in the same vertical plane with the steering axis approximately normal to the region of the spherical section 70 with which it cooperates.

As the control lever 74 is moved further from the vertical plane containing the axis of the input shaft 66 so the rotational speed of the output shafts 67a, 67b for a given speed of input shaft 66 will increase. The transmission ratio (that is the ratio of the speed of rotation of the output shafts 67a and 67b to the speed of input shaft 66) is equal to the ratio of the distance of the control lever 74 from the vertical plane containing the axis of the input shaft 66 to the radius of the sphere 70.

Typically, a more practical version of the arrangement shown in FIG. 8 may use a larger number of smaller wheels, such as 12 or 18, in order to have a greater level of contact on the sphere. Advantageously, two further assemblies, each like the assembly of disc 69, wheels 71a, 71b, and steering rods 73a and 73b, can be provided on the front and upper faces, respectively, of the casing 65. Of course, it will be appreciated that for convenience one particular orientation of the system of FIG. 8 has been described, but other orientations may be used.

FIG. 9 is a cut-away view of a spherical section of the rotary continuously variable transmission shown in FIG. 10 which contains a differential. Mounted inside the sphere 70 are bevel gears 77a and 77b whose centres of rotation are fixed relative to the sphere 70. The bevel gears 77a and 77b do not mesh with one another. The output shafts 67a and 67b are free to rotate relative to the sphere 70. The ends of the shafts 67a and 67b are fixed to respective bevel gears 78a and 78b (gear 78a is not shown in FIG. 9) which are driven from gears 77a and 77b. Typically wheels of a vehicle are fixed to shafts 67a and 67b, and the differential mechanism allows for the difference in speeds of the wheels while the vehicle is turning a corner.

FIG. 10 is a schematic side view of a rotary continuously variable transmission where rotary members engage on the inside of a sphere rather than the outside. Fixed to an input shaft 81 is a bevel gear 83 which drives a bevel gear 84 which forms a common member on which are mounted rotary members 85a, 85b. The rotary members 85a, 85b engage the spherically shaped inside surface of the casing 80 rotation of which forms the output of the system. A static reference shaft 82 is fixed to an exterior stationary point (not shown) and at its other end to a central support block 86. The rotary members 85a and 85b are kept loaded against the casing 80 by opposing wheels 88a and 88b supported by an axle 87 which rotates within the support block 86. Ratio control (not shown) may be achieved in a variety of ways, for example, by the moving of the shaft 82 and the support block 86 from side to side with a control rod and associated guides for steering the rotary members 85a, 85b mounted on the support block 86, or by introducing a control rod through the centre of one of shafts 81 or 82 and connecting a suitable wheel steering arrangement to it. The configuration of FIG. 10 is suitable for use in pedal cycles where the casing 80 forms the hub of the rear wheel and the shaft 81 is connected to the chain drive. As in FIG. 8 some of the constraints for the rotary members 85a, 85b are not shown.

FIG. 11 is a schematic perspective view of a planar continuously variable transmission. The common member and wheel assembly 91 runs on a surface 90 and is driven by a motor 92. A beam 93 is Shown as an example of a reference for the motor 92 and this may contain the necessary ratio and direction control equipment. It will be appreciated that the embodiment of FIG. 11 operates in a manner similar to the schematic arrangement of FIG. 1.

FIG. 12 is a schematic perspective view of a rotary continuously variable transmission similar to that of FIG. 8 but with the wheels 71 operatively engaging the sphere 70 over a limited region only. As in FIG. 8 there is casing 65, input shaft 66, output shafts 67a and 67b, gearing 68, common member 69, sphere 70, wheels 71a and 71b, wheel casings 72a and 72b, steering rods 73a and 73b and control lever 74. The sphere 70 of FIG. 12, however, has two surfaces: one rough surface 96 on which the wheels operatively engage and another smooth surface 97 which the wheels do not operatively engage because they are free to slide on it. Instead of making the surface 97 smooth it may be provided at a slightly smaller radius from the centre of sphere 70 than the surface 96 so that the wheels are out of contact with it.

FIG. 13 is a schematic perspective view of a system where two planar continuously variable transmissions engage the same surface. Two common member and wheel assemblies 101a and 101b run on a surface 100. The operation of both of the assemblies 101a and 101b is interlinked by a framework 102 onto which the necessary control equipment and load is mounted. This configuration may thus be part of a piece of equipment having additional degrees of freedom internally, or it may be itself a mobile system.

FIG. 14 is a schematic perspective view of a planar continuously variable transmission in which a common member and wheel assembly 106 engages onto an inner surface of a revolving belt 108 which is wrapped around two rollers 107a and 107b. The belt runs on a surface 105. Such an arrangement is useful where the surface 105 is unsuitable for direct contact by the common member and wheel assembly 106.

FIG. 15 is a schematic plan view of a feedback mechanism. Two bell cranks 110 are used to control the position of the coincidence point 114 of guide rods which, for the sake of example, will be considered to be the rods 7a to 7c in FIG. 1. The bell cranks 110a and 110b are mounted at their pivots 111a and 111b on the upper section 1 (or a member fixed to that upper section). The control ends 112a and 112b of the bell cranks are connected to respective single axis actuators, the other ends of which are fixed to the surface on which the wheels 6a to 6c rest. As the control points 112a and 112b are moved, the coincidence point 114 moves within the slots 113, giving rise to a change in transmission ratio (starting from zero transmission). The net effect is that the common member and wheel assembly follows the motion of the actuators with a lag proportional to the speed of rotation of the disc 2.

FIG. 16 shows a rotary mechanical amplifier with an input shaft 121, through which mechanical power is supplied, and a double ended output shaft 122a and 122b. The input shaft and output shaft are coupled via a continuously variable transmission that is substantially an inverted form of the arrangement shown in FIG. 8 so that the steering rods 73a and 73b of FIG. 8 are represented by steering rods 131a and 131b in FIG. 16. The amplifier receives a rotary input to be amplified on a control shaft 128a, 128b. A lead screw 127 is driven from the output shaft 122a, via a belt 124 and a pulley 123, and has the ability to move a collar 130, mounted within a block 126, parallel to the output shaft 122a and 122b. The collar 130 is free to rotate within the block 126, but is geared to another collar 129 which is keyed to the control shaft 128a.

Rotation of the control shaft 128a turns the collar 130 of the lead screw 127. If the rotational speeds of the collar 130 and the lead screw 127 are the same, then the collar 130 does not move along the lead screw 127. If they are different, the collar 130 moves along, moving the coincidence point of the steering rods 131a and 131b, which in turn alters the speed of the lead screw 127 (because it is driven by the output shaft 122a), leading to a matching of the speeds of the collar 130 and lead screw 127.

It is noticeable that the system of FIG. 16 produces a phase lag between output and control shafts which increases with speed of those shafts. Using an appropriate open loop or closed loop control system the lag can be significantly reduced or eliminated to produce an accurate servo system.

Whilst various embodiments of the invention have been described by way of example, it should be appreciated that many variations may be made to the illustrated embodiments. It will also be possible in many instances to use features described in respect of one of the embodiments in another embodiment.

I claim:

1. A continuously variable transmission system comprising:

at least two rotary members, a common member mounted on the rotary members, a surface with which the rotary members cooperate, the rotary members being free to rotate about their own axes of rotation and having perimeter regions cooperating with the surface at respective regions of cooperation in such a manner that substantial slippage of each rotary member relative to the surface in a direction parallel to the axis o rotation of the rotary member is prevented, and steering means operative to steer each rotary member about a respective axis, the common member and the surface being mounted for first and second kinds of motion relative to one another, the first kind of motion being relative rotation of the common member and the surface about an axis which is fixed relative to the common member and around which the rotary members are spaced, and the second kind of motion being a different relative motion of the common member and the surface, the steering means being arranged to steer the rotary members to vary continuously the ratio of the amount of the first kind of relative motion of the common member and the surface to the amount of the second kind of relative movement of the common member and the surface.

2. A system according to claim 1 in which the steering means includes a plurality of guides, one for each rotary member, each guide providing a mechanical link between a respective rotary member and a common control by movement of which the rotary members are steered.

3. A system according to claim 2 in which the common control comprises a ring to which the guides are pivotally connected.

4. A system as claimed in any one of the preceding claims, in which the effective positions of the rotary members' steering axes are altered by coupling steering members for the rotary members to other members steerable about other steered axes which are displaced towards or away from the common member's axis of rotation, the other steered axes being positioned in the same relative positions from the axis of rotation of the common member as the original steering axes.

5. A system as claimed in claim 1, in which the steering axis of each rotary member substantially intersects the axis of rotation of the respective rotary member, but, for one or more of the rotary members, the steering axis of the rotary member is offset by a small distance from passing through the rotary member's axis of rotation.

6. A system as claimed in claim 1, in which there is a positive engagement between one or more of the rotary members and the surface, the positive engagement resisting movement of the rotary member relative to the surface in a direction parallel to the axis of rotation of the rotary member.

7. A system as claimed in claim 6, in which the rotary members penetrate into or through the surface.

8. A system as claimed in claim 1, in which the surface is the outside of a sphere or part of a sphere constrained to rotate about a fixed axis.

9. A system as claimed in claim 8, in which the sphere contains the mechanism of a differential gearbox.

10. A system as claimed in claim 1, in which the surface is the inside of a sphere or part of a sphere constrained to rotate about a fixed axis.

11. A system as claimed in claim 1, in which the surface is substantially flat.

12. A system according to claim 1 in which the rotary members are arranged such that one or more of them move into and out of operative engagement with the surface as the common member rotates.

13. A system as claimed in claim 1, in which there are a plurality of common members each mounting at least two rotary members which cooperate with the surface.

14. A system as claimed in claim 1, in which the common member or members form part of a mobile arrangement which runs on the surface.

15. A system according to claim 14, in which the surface is defined by an intermediate part of the transmission system that is interposed between the rotary members and another surface over which the mobile arrangement runs.

* * * * *